(12) United States Patent
Mashevsky et al.

(10) Patent No.: US 7,743,419 B1
(45) Date of Patent: Jun. 22, 2010

(54) METHOD AND SYSTEM FOR DETECTION AND PREDICTION OF COMPUTER VIRUS-RELATED EPIDEMICS

(75) Inventors: Yury V. Mashevsky, Moscow (RU); Yury V. Namestnikov, Moscow (RU); Nikolay V. Denishchenko, Moscow (RU); Pavel A. Zelensky, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/631,830

(22) Filed: Dec. 6, 2009

(30) Foreign Application Priority Data

Oct. 1, 2009 (RU) ............................... 2009136234

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................ 726/24; 713/187; 713/188
(58) Field of Classification Search ................ 713/187, 713/188; 726/22, 23, 24, 25
See application file for complete search history.

(56) References Cited

U.S. PATENT DOCUMENTS

| | | | |
|---|---|---|---|
| 6,021,438 A | 2/2000 | Duvvoori et al. | |
| 7,039,551 B2 | 5/2006 | Shu et al. | |
| 7,373,665 B2 * | 5/2008 | Williamson et al. | 726/22 |
| 7,392,543 B2 * | 6/2008 | Szor | 726/23 |
| 7,418,732 B2 | 8/2008 | Campbell et al. | |
| 7,434,261 B2 | 10/2008 | Costea et al. | |
| 7,523,502 B1 | 4/2009 | Kennedy et al. | |
| 7,540,028 B2 | 5/2009 | Ahmed et al. | |
| 7,552,206 B2 | 6/2009 | Nikolayev et al. | |
| 2003/0051026 A1 | 3/2003 | Carter et al. | |
| 2006/0036619 A1 * | 2/2006 | Fuerst et al. | 707/100 |
| 2006/0070130 A1 | 3/2006 | Costea et al. | |
| 2006/0206615 A1 * | 9/2006 | Zheng et al. | 709/229 |
| 2006/0212723 A1 * | 9/2006 | Sheymov | 713/194 |
| 2006/0236392 A1 | 10/2006 | Thomas et al. | |
| 2006/0259967 A1 | 11/2006 | Thomas et al. | |
| 2006/0282891 A1 * | 12/2006 | Pasko | 726/23 |
| 2007/0006308 A1 | 1/2007 | Desouza et al. | |
| 2007/0174704 A1 | 7/2007 | Shih | |
| 2007/0240217 A1 * | 10/2007 | Tuvell et al. | 726/24 |
| 2007/0240218 A1 * | 10/2007 | Tuvell et al. | 726/24 |

(Continued)

FOREIGN PATENT DOCUMENTS

WO          WO0277758          3/2002

(Continued)

*Primary Examiner*—David García Cervetti
(74) *Attorney, Agent, or Firm*—Bardmesser Law Group

(57) ABSTRACT

A system, method and computer program product for detection of epidemics caused by malware programs or computer viruses. Detection of local and global epidemics is performed automatically. A source of an epidemic is calculated and analyzed based on collected statistics. A spread of the epidemic is predicted and an accurate prognosis referring to the time frame and to geographical areas of the epidemic spread is made. The prognosis is made based on a calculated value of "connection strength" coefficient. The connection strength coefficient reflects a volume of information exchange (i.e., a number and a quality of connection channels) between the countries. An epidemic is detected in its infancy and its spread is monitored in time and propagation across different countries. Then, effective security and protection measures can be invoked in a timely manner.

17 Claims, 7 Drawing Sheets

U.S. PATENT DOCUMENTS

| | | | |
|---|---|---|---|
| 2007/0240219 A1* | 10/2007 | Tuvell et al. | 726/24 |
| 2007/0240220 A1* | 10/2007 | Tuvell et al. | 726/24 |
| 2007/0240221 A1* | 10/2007 | Tuvell et al. | 726/24 |
| 2007/0240222 A1* | 10/2007 | Tuvell et al. | 726/24 |
| 2007/0300300 A1* | 12/2007 | Guo et al. | 726/23 |
| 2008/0028463 A1 | 1/2008 | Dagon et al. | |
| 2008/0086773 A1 | 4/2008 | Tuvell et al. | |
| 2008/0134335 A1 | 6/2008 | Kameda | |
| 2008/0178294 A1* | 7/2008 | Hu et al. | 726/24 |
| 2008/0201779 A1* | 8/2008 | Tahan et al. | 726/23 |
| 2008/0250497 A1* | 10/2008 | Mullarkey et al. | 726/22 |
| 2008/0271151 A1* | 10/2008 | Blake et al. | 726/25 |
| 2008/0276111 A1* | 11/2008 | Jacoby et al. | 713/340 |
| 2008/0320075 A1 | 12/2008 | Livshits et al. | |
| 2009/0016234 A1* | 1/2009 | Duffield et al. | 370/252 |
| 2009/0024991 A1 | 1/2009 | Campbell et al. | |
| 2009/0064332 A1 | 3/2009 | Porras et al. | |
| 2009/0073891 A1* | 3/2009 | Duffield et al. | 370/252 |
| 2009/0126012 A1* | 5/2009 | Treadwell et al. | 726/22 |
| 2009/0133123 A1 | 5/2009 | Radha et al. | |
| 2009/0180391 A1* | 7/2009 | Petersen et al. | 370/252 |
| 2009/0328220 A1* | 12/2009 | Abdel-Aziz et al. | 726/24 |

FOREIGN PATENT DOCUMENTS

| | | |
|---|---|---|
| WO | WO 02077758 A2 * | 10/2002 |

\* cited by examiner

METHOD AND SYSTEM FOR DETECTION AND PREDICTION OF COMPUTER VIRUS-RELATED EPIDEMICS

CROSS-REFERENCE TO RELATED APPLICATIONS

This application claims priority to Russian Patent Application No. 2009136234, filed Oct. 1, 2009, which is incorporated by reference herein in its entirety.

BACKGROUND OF THE INVENTION

1. Field of the Invention

The present invention is related to anti-malware technology, and more particularly, to detection and prevention of computer virus-related epidemics.

2. Description of the Related Art

Detection of viruses and malware has been a concern throughout the era of the personal computer. With the growth of communication networks such as the Internet and increasing interchange of data, including the rapid growth in the use of e-mail for communications, infection of computers and networks through communications or file exchanges is an increasingly significant consideration. Infections take various forms, but are mostly related to computer viruses Trojan programs, or other forms of malicious code (i.e., malware).

Recent incidents of e-mail mediated virus attacks have been dramatic in terms of speed of propagation and for the extent of damage, with Internet service providers (ISPs) and companies suffering service problems and a loss of e-mail and networking capability. In many instances, attempts to adequately prevent file exchange or e-mail mediated infections significantly inconvenience computer users and improved strategies for detecting and dealing with massive virus attacks that transform into epidemics are desirable.

A conventional approach to detecting viruses is signature scanning. Signature scanning systems use sample code patterns extracted from known malware code and scan for the occurrence of these patterns in another program code. A primary limitation of the signature scanning method is that only known malicious code is detected, that is, only code that matches the stored sample signatures of known malicious code is identified as infected. All viruses or malicious code not previously identified, and all viruses or malicious code created after the last update of the signature database will not be detected.

In addition, the signature analysis technique fails to identify a virus if the signature is not aligned in the code in the expected fashion. Alternatively, the authors of a virus may obscure the identity of the virus by opcode substitution or by inserting dummy or random code into the virus functions. Nonsense code can alter the signature of the virus to a sufficient extent as to be undetectable by a signature scanning program, without diminishing the ability of the virus to propagate and deliver its payload.

Another virus detection strategy is integrity checking. Integrity checking systems extract a code sample from known benign application program code. The code sample is stored together with the information from the program file, such as the executable program header and the file length, as well as the date and the time stamp of the sample. The program file is checked at regular intervals against this database to check that the program file has not been modified.

A conventional approach uses so-called white lists i.e., the lists of known "clean" software components, links, libraries and other clean objects. In order to compare a suspect object against the white list, hash values can be used. The use of hashes is disclosed, for example, in WO/2007066333 where the white list consists of hashes of known clean applications. In WO/2007066333, checksums are calculated and compared against the known checksums.

However, detection of a virus in a computer system is only one part of the task. It is far more important to detect a potential for an epidemic that can infect hundreds and thousands of computers within numerous networks. In US Patent Publication No. 20080134335, a method for determining a potential spread of a detected virus is disclosed. However, it happens after the virus hasstarted to spread and does not prevent an epidemic.

In US Patent Publication No. 20060259967 and US Patent Publication No. 20060236392 a method for detecting malware based on a level of activity of some events is disclosed. Once an activity threshold is reached, security measures are applied. U.S. Pat. No. 7,418,732 discloses a method for processing network packets in order to prevent from spreading malware within the network. In US Patent Publication No. 20090064332, a method for detecting a source of malware threat and determining the level of a potential hazard is disclosed. Also, in US Patent Publication No. 20060070130, a method for determining a source of malware once the malware is detected is disclosed.

However, conventional systems do not provide an efficient detection and prevention of epidemics when a massive number of computer systems and entire networks get infected very fast.

It is apparent that improved techniques for detection and prevention of computer virus-related epidemics are desired. Accordingly, there is a need in the art for a system and method that addresses the need for detecting and predicting the epidemics.

SUMMARY OF THE INVENTION

The present invention is intended as a method and system for detection and prediction of malware-related epidemics that substantially obviates one or several of the disadvantages of the related art.

In one aspect of the invention there is provided a system, method and computer program product for detection of epidemics caused by malware programs or computer viruses. According to an exemplary embodiment, detection of local and global epidemics is performed automatically. A source of an epidemic is calculated and analyzed based on collected statistics. Then, a spread of the epidemic is predicted and an accurate prognosis referring to a time frame and to geographical areas of spread is made. The prognosis is made based on a calculated value of "connection strength" coefficient. The connection strength coefficient reflects a volume of information exchange (i.e., a number and a quality of connection channels) between countries.

A method of the exemplary embodiment, automatically detects epidemics based on known activity level of malware programs in the world. A source of a malware causing an epidemic is calculated. A prognosis related to the development of epidemics is generated. The main goal is to detect an epidemic in its infancy and monitor its spread in time and across different countries. Thus effective security and protection measures can be invoked in a timely manner. After the epidemic prognosis is produced, an urgent update can be issued. Such an update can include a link including all various modification of a malware threat that causes the epidemic.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
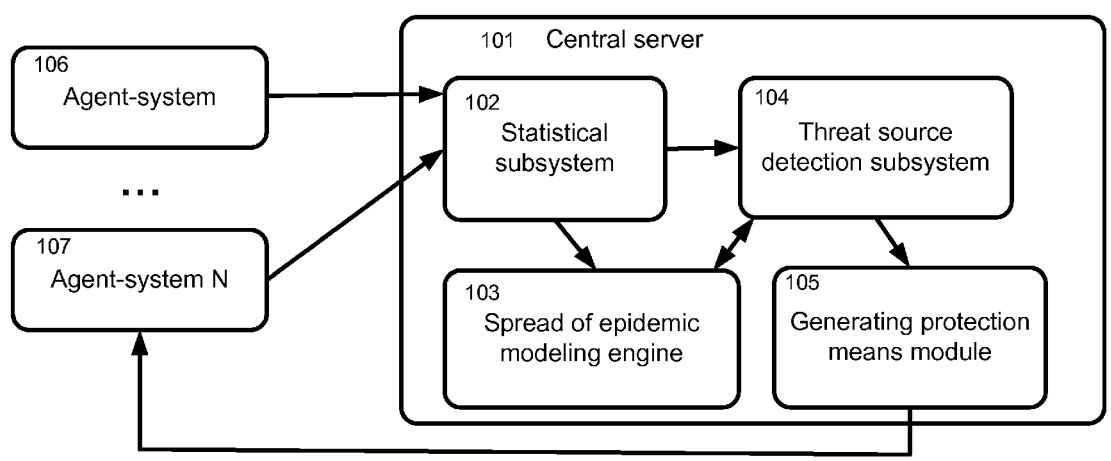
FIG. 1 illustrates a system for malware detection and analysis in accordance with the exemplary embodiment.

Reference will now be made in detail to the preferred embodiments of the present invention, examples of which are illustrated in the accompanying drawings.

According to the exemplary embodiment, a method, system and computer program product for detection and prediction of malware-related epidemics is provided. In one aspect of the invention there is provided a method that automatically detects epidemics based on known activity level of malware programs in the world. A source of a malware causing an epidemic is calculated based on statistical data. Then, a prognosis related to development of an epidemic is generated.

According to the exemplary embodiment an epidemic is detected in its infancy and a spread of the epidemic in time and across different countries is monitored. Effective security and protection measures can be invoked in an efficient and timely manner. After the epidemic prognosis is produced, an urgent update can be issued. Such an update can include a link with various modifications of a threat that causes the epidemic. If the epidemic is caused by a network worm that exploits system vulnerabilities, a notification to all users can be issued.

The notification contains methods for protection against the worm. The methods of protection include patches and configuration changes. If the malware prevents execution of anti-virus applications or installation of anti-virus patches, special curing applications can be provided to the users. According to the exemplary embodiment, a principle of epidemic detection is based on collecting and analyzing statistical data. Activity of various objects is calculated in real time.

The activity includes launches of programs, computer attacks (such as denial of service attacks), obvious attempts to exploit system security weaknesses, file downloads, etc. The activity value of a potential epidemic source is calculated based on the statistical data related to the activities considered above.

According to the exemplary embodiment, epidemic detection is based on the activity calculated for the source. Depending on the calculated value, the system determines whether the epidemic has indeed occurred. If the activity value in a particular country exceeds a country threshold, then beginning of the epidemic is detected.

In the exemplary embodiment, the activity is calculated in terms of at least four activity parameters: s—a number of application launches; d—a number of downloads; a—a number of attacks; e—a number of attempts to exploit system weaknesses. The activity of the object is calculated on account of probability distribution of each of the activity parameters.

The activity depends on the occurrence time of the last event related to the activity parameter. In other words, the more time passes since the event, the less is the activity of the object. Thus, activity of the old events plays a minimal part in the activity calculation. Small fluctuations can be disregarded, while the general trends of changing of each activity parameter can be revealed.

According to the exemplary embodiment, the activity is calculated as follows:

Activity=$F_1$(s, d, a, e)*$F_2$($\Delta$t), where $\Delta$t is time that passed since the last occurrence of the event related to a respective activity parameter. An exemplary activity calculation can be presented as:

| Total downloads d | Total startups s | Total attacks a | Total exploitation attempts e | Increase in downloads s | Increase in startups | Increase in attacks | Increase in exploitation attempts | $\Delta$t, min | Activity | Trend |
|---|---|---|---|---|---|---|---|---|---|---|
| 8 | 4 | 1 | 107 | 16 | 4 | 1 | 107 | 0 | 3.78 | Rise |
| 24 | 24 | 1 | 315 | 16 | 20 | 0 | 208 | 15 | 13.14 | Rise |
| 83 | 83 | 98 | 1082 | 59 | 59 | 07 | 767 | 15 | 44.63 | Rise |
| 164 | 162 | 74 | 2135 | 81 | 79 | 76 | 1053 | 15 | 87.39 | Rise |
| 249 | 240 | 47 | 3240 | 85 | 78 | 73 | 1105 | 15 | 131.28 | Rise |
| 380 | 354 | 246 | 4943 | 131 | 114 | 99 | 1703 | 15 | 197.63 | Rise |
| 501 | 451 | 586 | 6516 | 121 | 97 | 40 | 1573 | 15 | 257.23 | Stable |
| 551 | 530 | 862 | 7166 | 50 | 79 | 76 | 650 | 15 | 289.87 | Stable |
| 570 | 563 | 978 | 7413 | 19 | 33 | 16 | 247 | 105 | 43.27 | Fall |
| 571 | 568 | 995 | 7426 | 1 | 5 | 7 | 13 | 175 | 26.08 | Fall |

The statistical data in this table allows "reproducing the events back in time" to the point when the object had not been detected yet, but was already present in communication streams. This also allows finding a source distributing a malware file and determining the date and time of the beginning of epidemic caused by the malware file.

FIG. 1 illustrates a system for malware detection and malware-related epidemic analysis, in accordance with the exemplary embodiment. Defense modules 110 control the malware detection system. The defense modules 110 send incoming raw data to a real-time processing database 120. The data from the database 120 is compared against the white list service database 130. The data that does not correspond to the white lists is considered to be suspect. It is sent to the detection system 160 for a further analysis. Then, suspected malware is checked against the known malware AV database 150.

The suspect objects that do not match (i.e., are not found) against the white list database 130, or against the known malware database 150, are sent to the deferred analysis database 140, where they are analyzed using additional criteria. The relationships between various events taken within a certain multi-dimensional spectrum are determined.

For example, a file xvidpack58.exe was automatically downloaded onto a computer system. After the file download, files 12.exe, beeps.sys., sysprot2009.exe appear on the computer system without being detected. None of these files check against the white list of clean files or objects.

Then, it is obvious that the file xvidpack58.exe is a dropper (http:***en.wikipedia.org/wiki/Dropper), since other new files appear after the file xvidpack58.exe was downloaded. In other words, the file xvidpack58.exe initiated a launch of 12.exe, which, in turn, downloaded file sms.exe. Then the file 12.exe wrote the file sms.exe into system auto-start menu. Upon the system start up, the file sms.exe used the driver beeps.sys and started sysprot2009.exe.

The system detects the file xvidpack58.exe as a dropper and can isolate it. However, it is not sufficient for protecting the computer system, since the other malware files installed by the dropper are still on the system. Thus, some data pertaining to the files connected to the dropper is retrieved from a multidimensional database which allows detecting indirectly related files, such as, file sms.exe, which was not a part of the dropper. The multidimensional connections are determined based on the time frame of the dropper and the subsequent launch of the malware files.

The dimensional spectrum is defined by object attributes. In other words, a suspect application object is analyzed to determine whether its behavior resembles some behavior patterns typical for a malware object. For example, a suspect application consecutively launches execution of three files (this is a behavior pattern). The attributes in this case are files names, file locations, etc. Then, a determination can be made whether the behavior with these attributes is typical for the malware or for a clean object. Once the malicious nature of an object is determined, it is analyzed for an epidemic.

Figure 2:
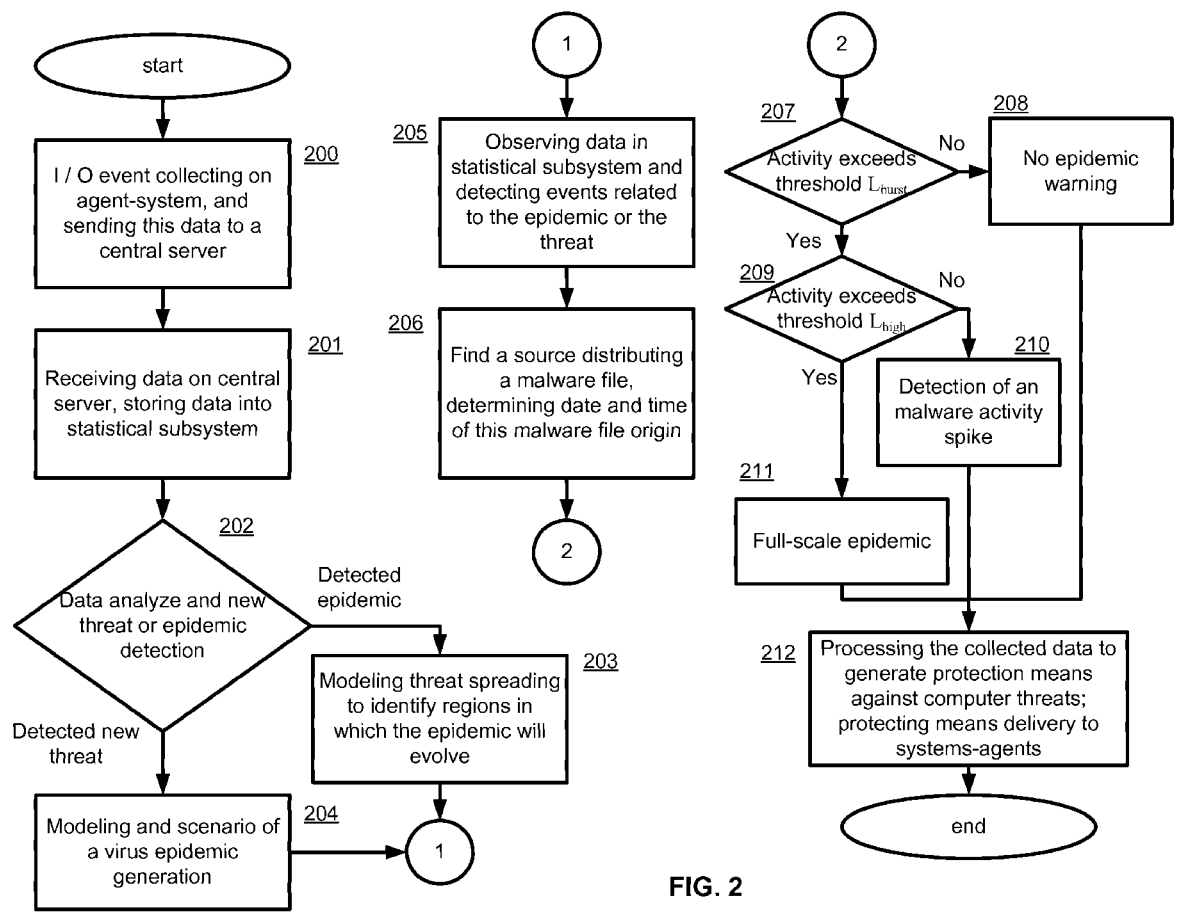
FIG. 2 illustrates a flow chart of a method in accordance with the exemplary embodiment.

FIG. 2 illustrates a flow chart of the method for the epidemic detection, in accordance with the exemplary embodiment. The proposed method has three phases: detection of bursts (or spikes) of malware-related activity, calculating a source of an epidemic and generating a prognosis for the epidemic development. The method uses information provided by the detecting system 160 (in FIG. 1). First, the information about detection of malware is received. Then, the information about the network attacks and about attempts to exploit system weaknesses is analyzed. The information about launching executable files and the information about file download is received. Some other malware-related information can be used as well, such as, subscriber-related data, changes in the system configuration, the auto-run records related to time of linking the object in Internet.

In step 210, a threat activity is calculated as $F_1(d, s, a ...)*F_2(\Delta t)$, where $\Delta t$ is time since the last occurrence of the event related to a respective activity parameter. If the activity calculated in step 210, exceeds a threshold (see examples in FIGS. 4 and 5) of a typical activity spike in step 220, it is determined, in step 230, if the activity exceeds a threshold of a typical epidemic.

Then, if the activity value exceeding the epidemic threshold is persistent (see step 240), it is concluded, in step 250, that the activity calculated in step 210 reflects an epidemic. If the conditions evaluated in steps 220, 230 and 240 are not met, then a conclusion follows, in step 260, that the activity, calculated in step 210, does not reflect an epidemic.

If the epidemic is detected, an automatic generation of prognosis of epidemic development starts. The generated prognosis can indicate to which countries the epidemic can spread and during which time period it can occur. In order to generate the prognosis, a value of "connection strength" coefficient is used. The connection strength coefficient reflects a volume of information exchange (i.e., a number and a quality of connection channels) between certain countries.

Figure 3:
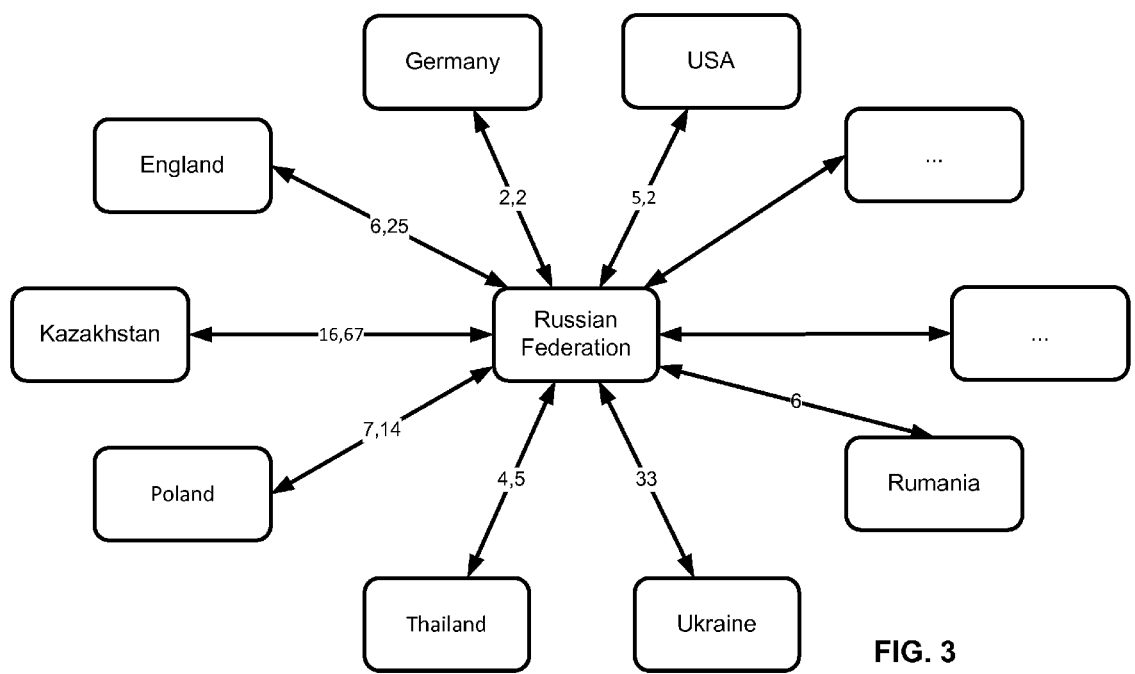
FIG. 3 illustrates an example of connection strength coefficients, in accordance with the exemplary embodiment.

FIG. 3 illustrates an example of connection strength coefficients, in accordance with the exemplary embodiment. As seen from example in FIG. 3, a connection strength coefficient between the Russian Federation and Kazakhstan is 16.67 and a connection strength coefficient between the Russian Federation and Germany is 2.2. Thus, an epidemic can spread from the Russian Federation to Kazakhstan much faster due to a larger number of available connection channels between these countries. Yet, an epidemic can spread from the Russian Federation to Ukraine even faster, since in this example the connection strength coefficient between the Russian Federation and Ukraine is 33. In other words, the epidemics can spread faster between the neighboring countries, or between more developed industrialized nations.

Figure 4:
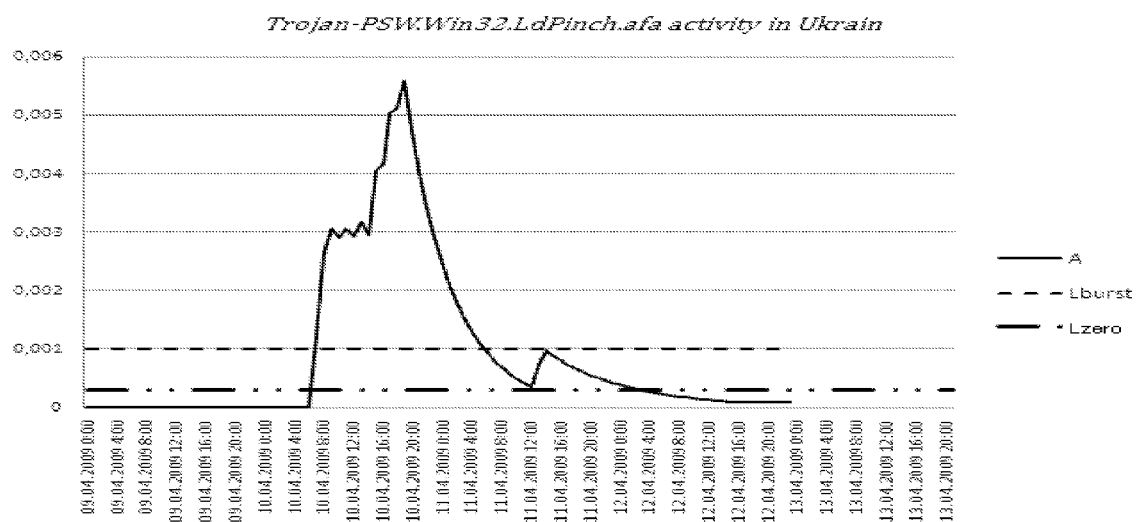
FIG. 4 illustrates an exemplary graph reflecting detection of an activity spike in accordance with the exemplary embodiment.

FIG. 4 illustrates an exemplary graph reflecting an activity burst, in accordance with the exemplary embodiment. The bursts (or spikes) of malware activity are detected. Let i be a beginning of a burst of malware (i.e., threat) activity j in country $C_m$. The activity of the threat $A(d, s, a, ...)$, where d, s, a are activity parameters, is calculated as $F_1(d, s, a...)*F_2(\Delta t)$. Let $L_{burst}$ be an activity threshold. Then, if the activity exceeds the threshold, e.g., $A(d, s, a, ...)>L_{burst}$, the epidemic might be present. The duration of burst i can be defined as following:

When $A(d, s, a, ...) \leq L_{burst}$ and $i \notin (a; b]$, where $a \neq i$ is a beginning of the burst of malware activity and b is a moment of an end of the burst. A moment i+a can be considered to be an end of the burst if activity reaches relative zero value over a time interval (i; i+a]. Thus, $A(d, s, a, ...) \leq L_{zero}$, $L_{zero} < L_{burst}$, where i is a beginning of the burst, and the interval [i; i+a] is a duration of the burst.

If a burst of malware activity is persistent and its activity continues to rise, the epidemic detection process starts. A moment i is considered to be the beginning of an epidemic of a threat j in a country $C_m$, if activity $A(d, s, a, ...)$ exceeds a threshold $L_{high}$ over an entire time interval $[i; i+\Delta T_{epid}]$.

An end of the epidemic is the moment i+a, when the activity $A(d, s, a, ...)$ first reaches a low threshold $L_{low}$: $A(d, s, a, ...) \leq L_{low}$, $L_{low} \leq L_{high}$ within a time interval (i; i+a], where i is a beginning of the epidemic and the time interval [i; i+a] is the epidemic duration. Note that the values of the upper and lower activity thresholds are recalculated based on the current malware activity in the world. An activity calendar is maintained for each country. This allows for reduction of the threshold at times when a number of the active computers in the country is reduced, for example, at night, on weekends or during the summer months.

Thus, the activity thresholds are adjusted in accordance with the user's activity in a particular country at certain times. The threshold adjustment is implemented automatically. If the overall activity within the country decreases, the threshold for this country is automatically lowered and if the overall activity goes up, the threshold is automatically increased.

Using the calculations above, for the example depicted in FIG. 4, the system detects a Trojan-PSW.Win32.Ldpinch.afa threat occurring in Ukraine. The system has determined that the activity is a burst but not an epidemic. While the burst threshold $L_{burst}$ exceeds, the activity does not exceed the epidemic threshold and actually decreases below the lower threshold $L_{zero}$.

Figure 5:
FIG. 5 illustrates an exemplary graph reflecting detection of an epidemic in accordance with the exemplary embodiment.

FIG. 5 illustrates an exemplary graph reflecting detection of an epidemic, in accordance with the exemplary embodiment. In this example, a threat Net-Worm.Win32.Kido.ih is detected in Russia. The activity of the threat increases as more notifications of activity parameters (application launches, attacks, etc.) are received. In this example, a burst threshold level $L_{burst}$ was first exceeded on 1.15.2009 at 21:34:02. For the next few days the activity remained at this level and then on 1.21.2009 at 01:00 the activity exceeded the level of the epidemic threshold A and remained at this level during a subsequent monitoring period. Thus, the activity was determined to be an epidemic.

In one embodiment, a source of an epidemic is calculated. A number of epidemic-related malware applications are selected. Epidemic-related URLs, file prints, behavior patterns, etc. are also selected from a multi-dimensional database. Using selected data a search for a very first event is performed. For example, a source of an epidemic can be calculated as follows.

On 11.04.2009 an epidemic of malware Trojan-PSW.Win32.LdPinch.afar was detected. At the moment of detection the object had a hash value md5=0991298F7E8AEE1667F8626D777A049C and was distributed through the URLs (see appendix 1)

After making a selection from the database, it was determined that the files had hash values:
MD5=298E724357C96FD372F94B64FDA7EAF7;
6795 DB80E5B1C687C155B116E1FC5502;
FE347FF115F1EDBA5B2B75BC46BBCB60; and
022E210B2A17FE8A5F9B072C29595367 are also detected under this name.

Then, a search for a date the first event connected with these objects produced the information indicating that the file with md5=022E210B2A17FE8A5F9B072C29595367 was first placed on 04.10.2009 at 12:51 at hxxp:**chaofu.org/wg/woool.exe. It was downloaded and launched on 04.10.2009 at 12:59. Thus, a conclusion can be made that the epidemic of the malware started from this URL.

Figure 6:
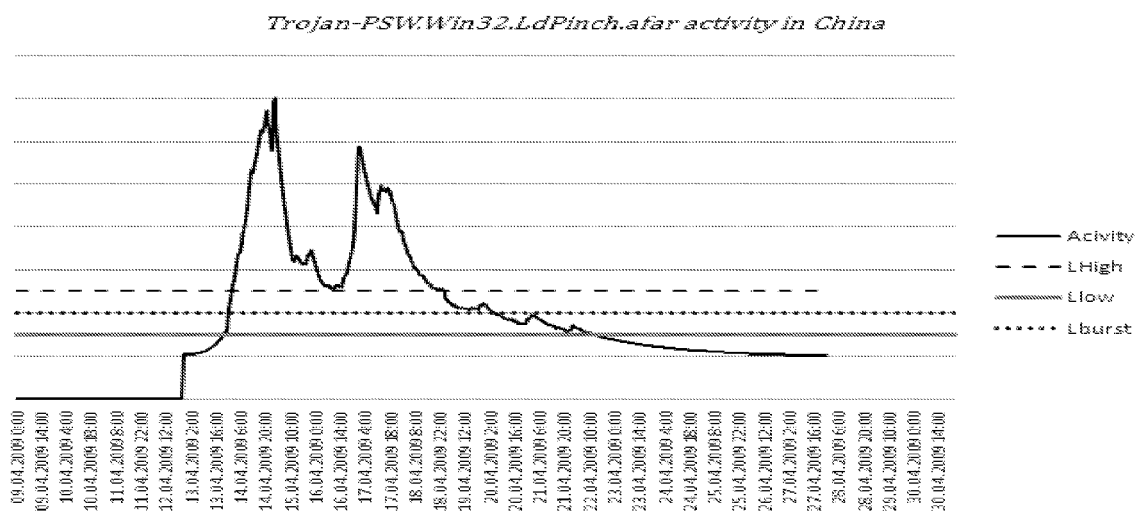
FIG. 6 illustrates an exemplary graph reflecting an epidemic prognosis in accordance with the exemplary embodiment.

FIG. 6 illustrates an exemplary graph reflecting an epidemic prognosis, in accordance with the exemplary embodiment. According to the exemplary embodiment, the prognosis indicates a speed and direction of malware propagation. The prognosis is based on the connections and volume of information exchange between the countries. The proposed method uses cluster analysis to group the countries based on their connections. Then, the groups of the countries, where malware propagation is most likely to occur if an epidemic is detected in one of the countries from the group, are determined.

The connection strength coefficient is used for making a prognosis in terms of probability of spreading of malware detected in one country into some other countries within the group. The prognosis of a level of activity in a particular country when the epidemic starts there can also be made.

FIG. 6 depicts an example of a prognosis made for threat Trojan-PSW.Win32.Ldpinch.afar detected on 04.12.2009 at 22:04:20 in China. On 04.13.2009 at 23:00 the system detected activity burst (i.e., the threshold $L_{burst}$ was exceeded). Then, on 04.14.2000 at 0:01:34 the system determined that spreading of Trojan-PSW.Win32.Ldpinch.afar is an epidemic (i.e., the threshold level $L_{high}$ was exceeded).

The system generates a prognosis of the epidemic development in terms of affected countries and the time frame. The prognosis indicates a probability of spreading of the epidemic in a given country and also predicts an activity level ($L_{high}$) once the epidemic begins there. An exemplary prognosis table may look like this one:

| Country (connection strength) | +1 Hour | | +2 hours | | +3 hours | | +4 hours | |
|---|---|---|---|---|---|---|---|---|
| Viet Nam (5.8) | 81.20 | 1450.00 | 85.26 | 1522.5 | 93.79 | 1674.75 | 94.72 | 1691.50 |
| Hong Kong (2.7) | 37.80 | 675.00 | 39.69 | 708.75 | 3.66 | 779.63 | 44.10 | 787.42 |
| USA (2.6) | 36.40 | 650.00 | 38.22 | 682.50 | 42.04 | 750.75 | 42.46 | 758.26 |
| Russian Federation (2.2) | 30.80 | 550.00 | 32.34 | 577.50 | 35.57 | 635.25 | 35.93 | 641.60 |
| Spain (1.8) | 25.20 | 450.00 | 26.46 | 472.50 | 29.11 | 519.7 | 29.40 | 524.95 |
| Brazil (1.5) | 21.00 | 375.00 | 22.05 | 393.75 | 24.26 | 433.1 | 24.50 | 437.46 |

For each hour, the first column indicates a probability of an epidemic in the country and activity level that the epidemic will reach at this time.

Those skilled in the art will appreciate that the exemplary embodiment advantageously determines a source of the epidemic. It can also monitor an epidemic development in time and over geographical areas. An accurate prognosis reflecting spreading of the malware epidemic is made.

According to the exemplary embodiment, the epidemics can be detected globally as well as in a certain area of the country or within a geographic region. Slow developing epidemics that consistently spreads various computer worms (such as, for example, Email-Worm.Win32.NetSky) can also be detected and effectively dealt with based on the determination of the source and development prognosis.

Figure 7:
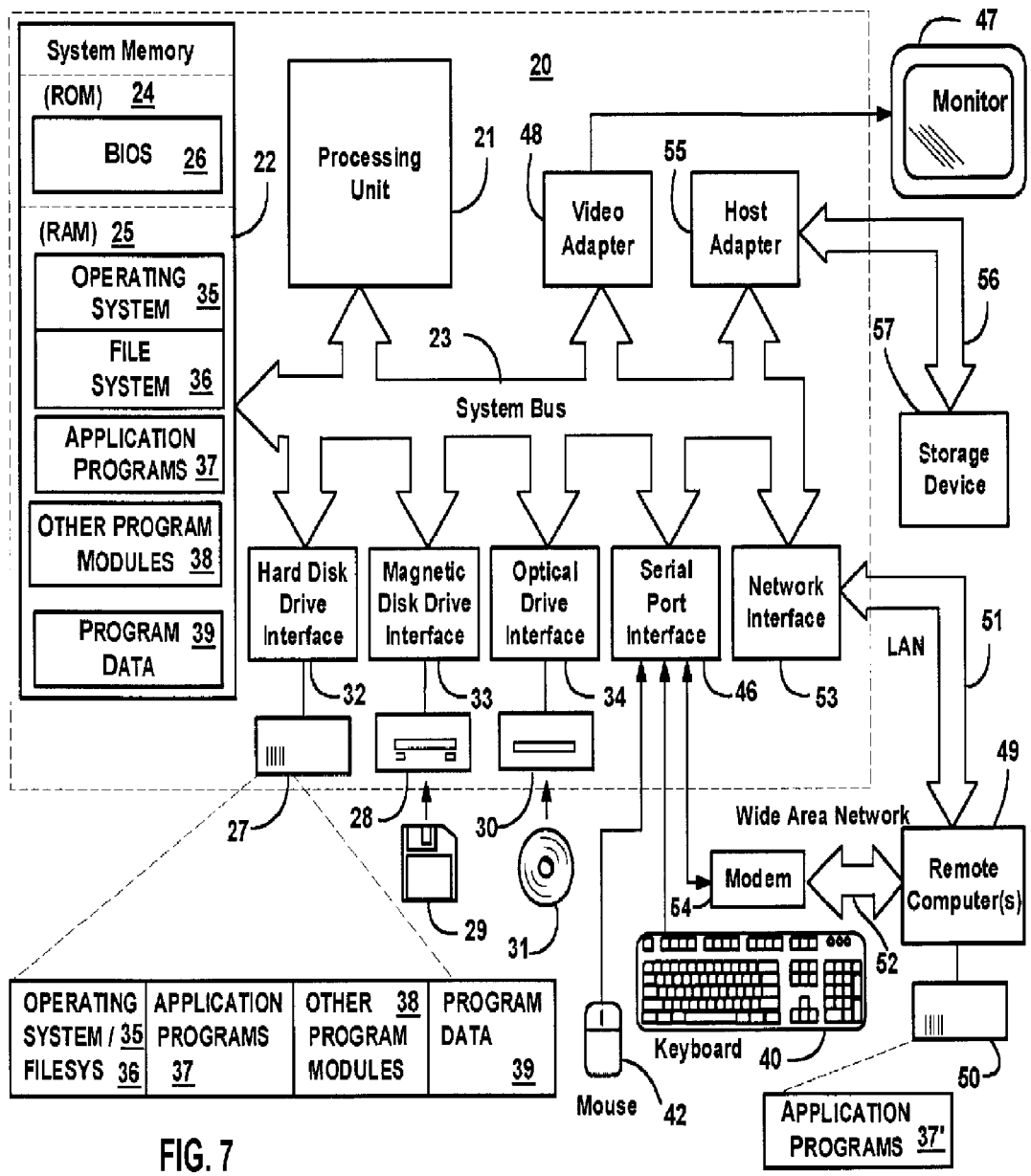
FIG. 7 illustrates a schematic of an exemplary computer system on which the invention can be implemented.
Figure 2:
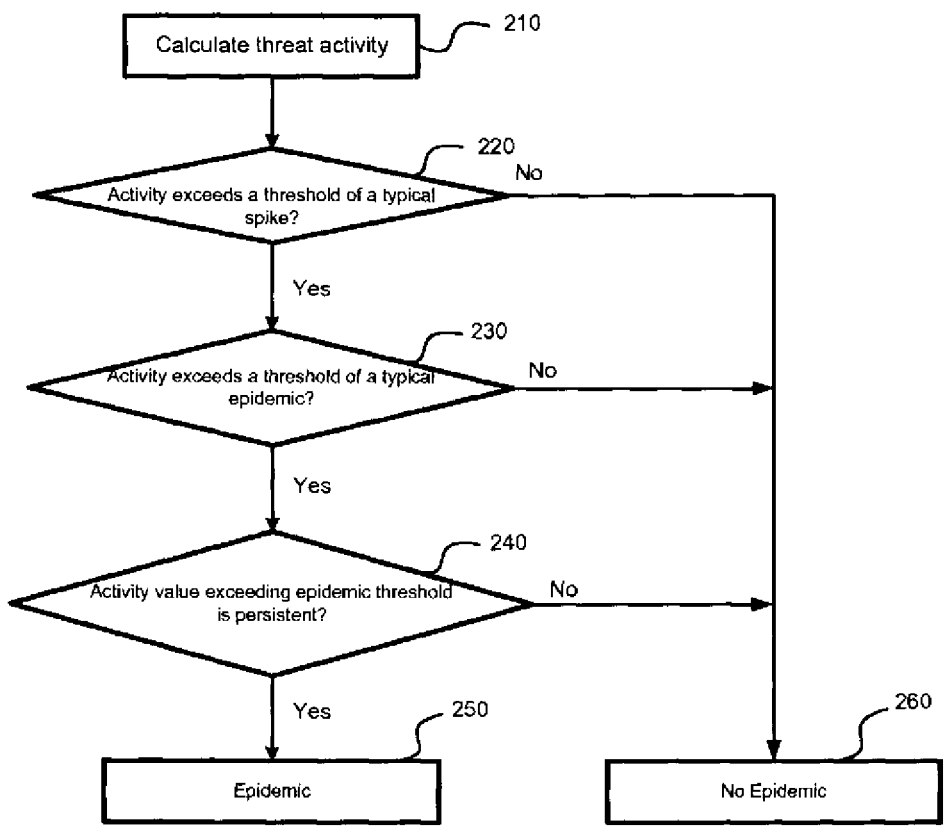

With reference to FIG. 7, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection and prevention of computer virus-related epidemics.

It should also be appreciated that various modifications, adaptations and alternative embodiments thereof may be made within the scope and spirit of the present invention. The invention is further defined by the following claims.

APPENDIX 1

The URLs used in example depicted in FIG. 5 (the "//" in the URL is replaced by "**"):

hxxp:117.23.205.231/uk/A26.exe hxxp:heiiwi.cn/zip/pic16.exe hxxp:heiiwi.cn/zip/pic17.exe hxxp:keowo.cn/zip/pic12.exe hxxp:keowo.cn/zip/pic22.exe hxxp:keowo.cn/zip/pic26.exe hxxp:qq.xhy2.cn/hb/33.exe hxxp:u3.wgcn8.com/lm/S1.exe hxxp:www.cvbnmdgesc.cn/24.exe hxxp:www.cvbnmdgesc.cn/4.exe hxxp:www.googlessndication.cn:6135/1/aa17.exe hxxp:www.tsyouxia.com/RichedPack.exe hxxp:wywfs.wywfs.com.cn/mm/ok13.exe hxxp:wywfs.wywfs.com.cn/mm/ok15.exe hxxp:wywfs.wywfs.com.cn/mm/ok17.exe hxxp:wywfs.wywfs.com.cn/mm/ok23.exe hxxp:wywfs.wywfs.com.cn/mm/ok24.exe hxxp:117.23.205.227/uk/A02.exe hxxp:117.23.205.227/uk/A14.exe hxxp:chaofu.org/wg/wooo1.exe hxxp:heiiwi.cn/zip/pic07.exe hxxp:u4.wgcn8.com/gb/B7.exe hxxp:www.cvbnmdgesc.cn/21.exe hxxp:wywg.69qb.cn/wywg/cb/lbtjjs.exe hxxp:**wywg.wushuibao.com.cn/wywg/cb/hdwdp5.exe

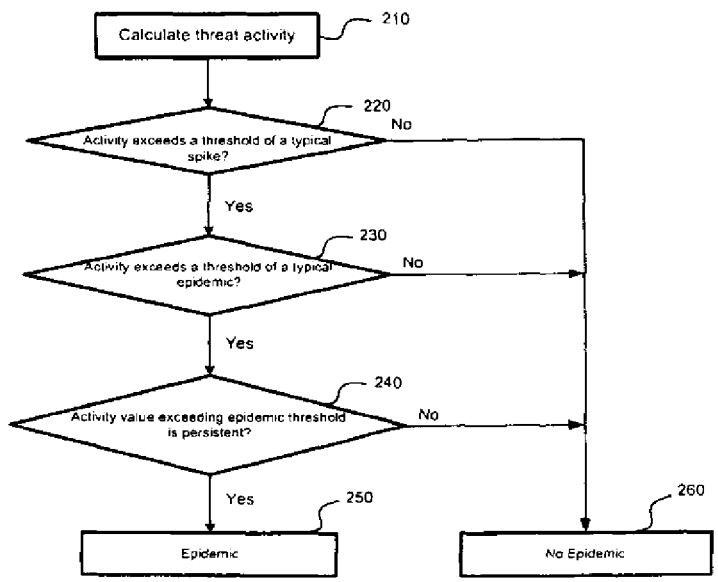

What is claimed is:

1. A method for detecting a malware epidemic, the method being performed on a computer having a processor and a memory, the method comprising:
   (a) detecting a malware-related threat;
   (b) calculating an activity value for this threat based on parameters of the threat;
   (c) setting a threshold value for the threat activity burst based on known bursts of the threat activity;
   (d) setting a threshold value for a threat activity epidemic based on the known epidemics;
   (e) comparing the threat activity value against the threat activity burst threshold;
   (f) comparing the threat activity value against the threat activity epidemic threshold, if the threat activity exceeds the threat activity burst threshold;
   (g) monitoring the threat activity over a selected time period, if the threat activity exceeds the activity epidemic threshold; and
   (e) detecting the malware epidemic, if the threat activity persistently exceeds the activity epidemic threshold over the pre-set time period.

2. The method of claim 1, wherein the parameters of the threat are:
   launches of applications;
   attacks on computer systems;
   attempts to exploit system security weaknesses; and
   file downloads.

3. The method of claim 1, wherein the threat activity burst threshold is set according to the activity burst statistics of a geographic region where the malware-related threat is detected.

4. The method of claim 1, wherein the threat activity epidemic threshold is set according to statistics of the epidemic activity of a geographic region where the malware-related threat is detected.

5. The method of claim 1, wherein, if the threat activity value does not exceed the threat activity epidemic threshold, the activity is considered to be a burst of the threat activity.

6. The method of claim 1, further comprising generating a prognosis for spreading of the epidemic.

7. The method of claim 6, wherein the prognosis reflects a probability of the malware threat epidemic in another geographic area.

8. The method of claim 6, wherein the prognosis reflects a level of activity of the malware threat epidemic once it spreads to another geographic area.

9. A method for generating a prognosis for malware epidemic, the method being performed on a computer having a processor and a memory, the method comprising:
   detecting an epidemic in a source geographic area;
   calculating connection strength coefficients between the source geographic area and other connected geographic areas;
   calculating a probability of the epidemic for each of the connected geographic areas based on the connection strength coefficients between the source geographic area and the connected geographic area; and
   calculating an activity level of the epidemic in each of the connected geographic areas for pre-set time increments, wherein the activity level is calculated based on malware parameters.

10. The method of claim 9, further comprising determining a source of the epidemic by analyzing hash values of the malware files and distribution sources of the files.

11. The method of claim 9, wherein the malware parameters are:
    launches of applications;
    attacks on computer systems;
    attempts to exploit system security weaknesses; and
    file downloads.

12. The method of claim 9, wherein the connection strength coefficients are calculated based on a number of connection channels between the geographic areas.

13. The method of claim 9, wherein the connection strength coefficients are calculated based on volume of information exchange between the geographic areas.

14. The method of claim 9, wherein the geographic areas are countries.

15. The method of claim 9, wherein the geographic areas are regions within a country.

16. The method of claim 9, wherein the prognosis is generated automatically upon detection of the epidemic.

17. A system for detection of a malware-related epidemic, the system comprising:
    a processor and a memory in a computer configured to implement
    a malware detection system;
    a real-time processing database coupled to the malware detection system;
    a defense module;
    a white list database accessible by the malware detection system;
    an anti-virus (AV) record database coupled to the defense module and accessible by the malware detection system; and
    a deferred analyses database coupled to the real-time processing database,
    wherein:
    raw data, received from the defense module by the real-time processing database is compared against the white list database;
    the detection system receives the data from the real-time processing database and runs the data against the AV data base;
    the defense module determines if the data contains malware; and
    if the malware is detected, the defense module calculates an activity level for the malware;
    the defense module determines a source of the malware;
    the defense module determines if the malware causes an epidemic; and
    if the epidemic is detected, the defense module generates a prognosis for spread of the epidemic.

* * * * *

UNITED STATES PATENT AND TRADEMARK OFFICE
CERTIFICATE OF CORRECTION

Page 1 of 3

PATENT NO. : 7,743,419 B1
APPLICATION NO. : 12/631830
DATED : June 22, 2010
INVENTOR(S) : Mashevsky et al.

It is certified that error appears in the above-identified patent and that said Letters Patent is hereby corrected as shown below:

Delete title page, and replace with new title page. (attached)

Please replace FIG. 1 with the following figure:

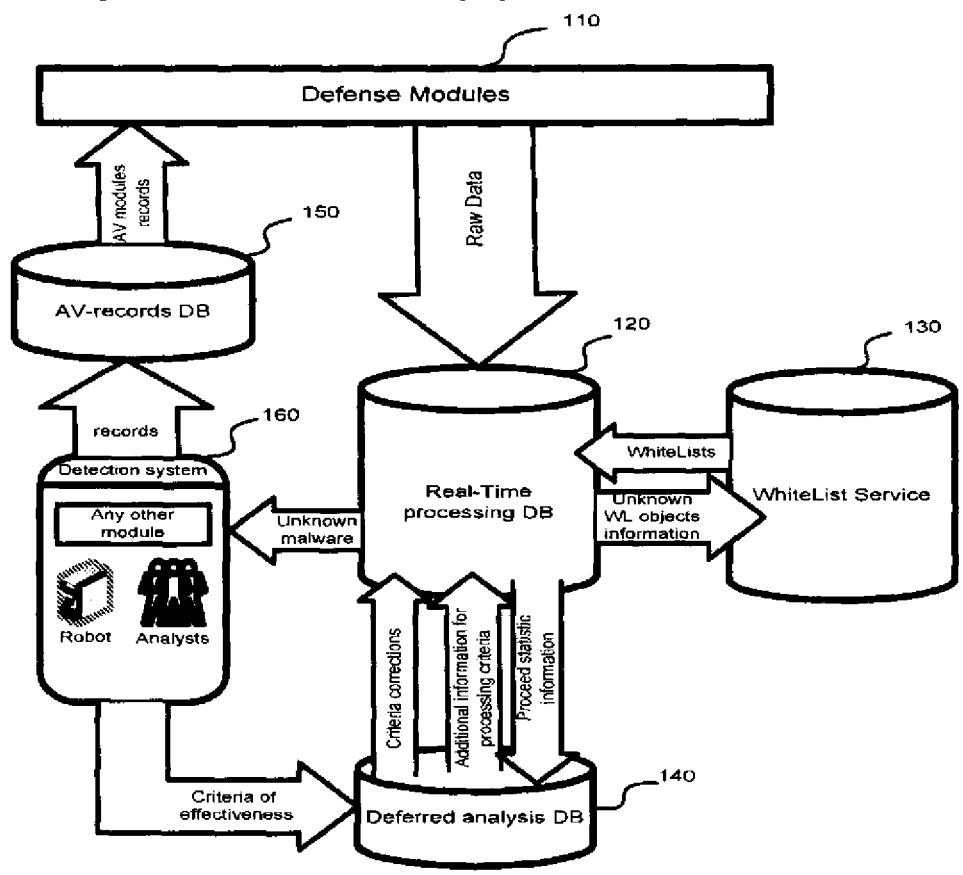

FIG. 1

Signed and Sealed this
Fifth Day of June, 2012

David J. Kappos
*Director of the United States Patent and Trademark Office*

Please replace FIG. 2 with the following figure:

United States Patent
Mashevsky et al.

(10) Patent No.: US 7,743,419 B1
(45) Date of Patent: Jun. 22, 2010

(54) METHOD AND SYSTEM FOR DETECTION AND PREDICTION OF COMPUTER VIRUS-RELATED EPIDEMICS

(75) Inventors: Yury V. Mashevsky, Moscow (RU); Yury V. Namestnikov, Moscow (RU); Nikolay V. Denishchenko, Moscow (RU); Pavel A. Zelensky, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/631,830

(22) Filed: Dec. 6, 2009

(30) Foreign Application Priority Data

Oct. 1, 2009 (RU) .............. 2009136234

(51) Int. Cl.
*G06F 11/00* (2006.01)
*G06F 12/14* (2006.01)
*G06F 12/16* (2006.01)
*G08B 23/00* (2006.01)

(52) U.S. Cl. .............. 726/24; 713/187; 713/188
(58) Field of Classification Search .............. 713/187, 713/188; 726/22, 23, 24, 25
See application file for complete search history.

(56) References Cited

U.S. PATENT DOCUMENTS

| 6,021,438 | A | 2/2000 | Duvvoori et al. |
| 7,039,551 | B2 | 5/2006 | Shu et al. |
| 7,373,665 | B2* | 5/2008 | Williamson et al. ........ 726/22 |
| 7,392,543 | B2* | 6/2008 | Szor ........................ 726/23 |
| 7,418,732 | B2 | 8/2008 | Campbell et al. |
| 7,434,261 | B2 | 10/2008 | Costea et al. |
| 7,523,502 | B1 | 4/2009 | Kennedy et al. |
| 7,540,028 | B2 | 5/2009 | Ahmed et al. |
| 7,552,206 | B2 | 6/2009 | Nikolayev et al. |
| 2003/0051026 | A1 | 3/2003 | Carter et al. |
| 2006/0036619 | A1* | 2/2006 | Fuerst et al. ............ 707/100 |
| 2006/0070130 | A1 | 3/2006 | Costea et al. |
| 2006/0206615 | A1* | 9/2006 | Zheng et al. ............ 709/229 |
| 2006/0212723 | A1* | 9/2006 | Sheymov ............... 713/194 |
| 2006/0236392 | A1 | 10/2006 | Thomas et al. |
| 2006/0259967 | A1 | 11/2006 | Thomas et al. |
| 2006/0282891 | A1* | 12/2006 | Pasko .................... 726/23 |
| 2007/0006308 | A1 | 1/2007 | Desouza et al. |
| 2007/0174704 | A1 | 7/2007 | Shih |
| 2007/0240217 | A1* | 10/2007 | Tuvell et al. ............ 726/24 |
| 2007/0240218 | A1* | 10/2007 | Tuvell et al. ............ 726/24 |

(Continued)

FOREIGN PATENT DOCUMENTS

WO WO0277758 3/2002

(Continued)

*Primary Examiner*—David Garcia Cervetti
(74) *Attorney, Agent, or Firm*—Bardmesser Law Group

(57) ABSTRACT

A system, method and computer program product for detection of epidemics caused by malware programs or computer viruses. Detection of local and global epidemics is performed automatically. A source of an epidemic is calculated and analyzed based on collected statistics. A spread of the epidemic is predicted and an accurate prognosis referring to the time frame and to geographical areas of the epidemic spread is made. The prognosis is made based on a calculated value of "connection strength" coefficient. The connection strength coefficient reflects a volume of information exchange (i.e., a number and a quality of connection channels) between the countries. An epidemic is detected in its infancy and its spread is monitored in time and propagation across different countries. Then, effective security and protection measures can be invoked in a timely manner.

17 Claims, 7 Drawing Sheets